United States Patent [19]
Eggen

[11] 3,777,141
[45] Dec. 4, 1973

[54] DEVICE FOR SECURING A FILM FOR DENTAL X-RAY TO A RIGHT-ANGLED FILM HOLDER AND AIMING ROD BY MEANS OF A RAY-PERMEABLE BITE BLOCK WITH FILM SUPPORT AND AN ANTAGONIST BITE PLATE

[76] Inventor: Svein Eggen, Weidemannsgate 6, 2600 Lillehammer, Norway

[22] Filed: July 10, 1972

[21] Appl. No.: 270,369

[30] Foreign Application Priority Data
Sept. 2, 1971  Norway.............................. 3265/71

[52] U.S. Cl. .......................... 250/521, 250/451
[51] Int. Cl. ........................................... G03b 17/26
[58] Field of Search........................... 250/64, 69, 70

[56] References Cited
UNITED STATES PATENTS

| | | | |
|---|---|---|---|
| 2,688,096 | 8/1954 | Galliano et al. | 250/70 |
| 2,123,210 | 7/1938 | Schantz | 250/64 |
| 3,304,422 | 2/1967 | Medwedeff | 250/70 |
| 3,473,026 | 10/1969 | Updegrave | 250/70 |

FOREIGN PATENTS OR APPLICATIONS

| | | | |
|---|---|---|---|
| 919,907 | 11/1954 | Germany | 250/70 |

*Primary Examiner*—William F. Lindquist
*Attorney*—S. Delvalle Goldsmith et al.

[57] ABSTRACT

A device for securing a film for dental X-ray in a right angle to a film holder and aiming rod.

4 Claims, 5 Drawing Figures

PATENTED DEC 4 1973 3,777,141

DEVICE FOR SECURING A FILM FOR DENTAL X-RAY TO A RIGHT-ANGLED FILM HOLDER AND AIMING ROD BY MEANS OF A RAY-PERMEABLE BITE BLOCK WITH FILM SUPPORT AND AN ANTAGONIST BITE PLATE

When taking intra oral X-rays, the dental film is arranged at the rear of the actual tooth. In conventional free-hand technique, the bisecting-angle technique is used, i.e. a relatively complex evaluation of the imaginary plane which bisects the longitudinal axis of the tooth and the plane of the film.

From U.S. Pat. No. 3.473.026, for example, an instrument is known which is adapted to the bisecting-angle technique. From U.S. Pat. No. 3.304.422 an instrument is known whereby the film is mounted at right-angles to an aiming rod, so that the bisecting-angle technique is avoided. The present invention is based on such an instrument and the object is to provide a device for securing a film for dental X-ray to a right-angled film holder and aiming rod by means of ray-permeable bite block with film support and an antagonist bite plate.

The object of the invention is to provide a device which permits use of all the usual film sizes and also permits the film to be disposed in the holder either on its short edge or long edge, in a central or excentric position. By disposing the film excentrically, the problem with difficult molars is solved without the necessity of an auxiliary, angled film holder.

An object of the invention is also to provide a disposable bite block which can readily be connected to or removed from the aiming rod and is disposed of after used. The aiming rod can be re-used after sterilization.

According to the invention, therefore, the bite block on the side thereof facing toward the aiming rod is provided with studs which are passed through corresponding orifices in the aiming rod, and the antagonist bite plate is provided with orifices within which the studs on the bite block can be pressed, the bite block being thereby locked to the aiming rod. The bite block thus acts as film support and holds the film in place with a distributed pressure that protects the film emulsion. After use, the bite block and antagonist bite plate can readily be removed from the aiming rod and disposed of.

The studs on the bite block can be suitably provided with respective locking wreath, the orifices in the antagonist bite plate being provided with a step or a locking collar so that a secure interlocking of bite block and antagonist bite plate is ensured.

A particularly advantageous embodiment example is characterized in that the bite block and the antagonist bite plate are interconnected by means of hinges. This facilitates their use substantially.

The invention is further described with reference to the drawings, where

Figure 2:
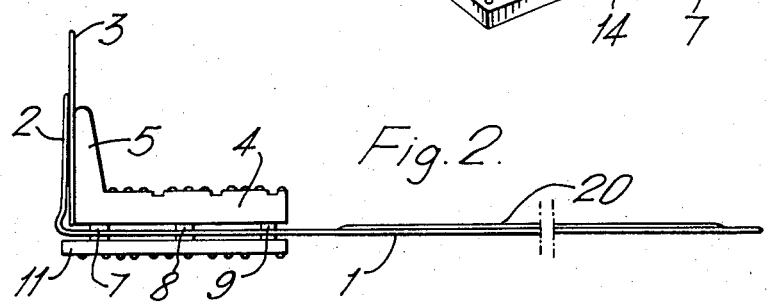
FIG. 2 is a side view of the device according to the invention mounted on a right angle film holder and aiming rod.
Figure 3:
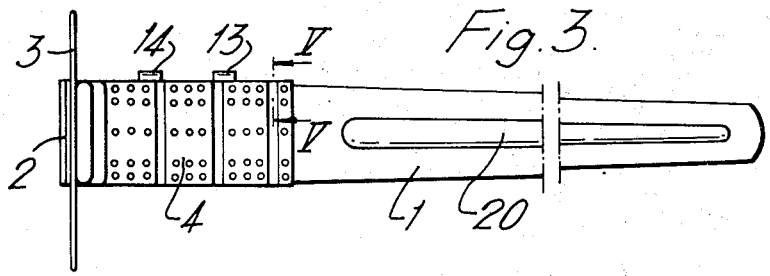
FIG. 3 is a horizontal projection of FIG. 2.

In FIGS. 2 and 3, an aiming rod 1 produced from metal is illustrated. The aiming rod is bent at right angles at one end 2 thereof. The film 3 is disposed such that it is supported against the angled portion of the aiming rod 1 and is clamped tightly by the bite block 4. The bite block 4 is provided, for this purpose, with a film support 5 and is secured to the aiming rod 1 by means of six studs 7, 8 and 9. Said studs project on the side of the bite block 4 facing toward the aiming rod 1 and are pressed through corresponding orifices 10 (FIG. 5) in the aiming rod 1. An antagonist bite plate 11 is arranged on the underside of the aiming rod, the said bite plate being provided with corresponding orifices 12 within which the studs may be pressed. In this manner, the bite block 4 is locked to the aiming rod 1.

Figure 1:
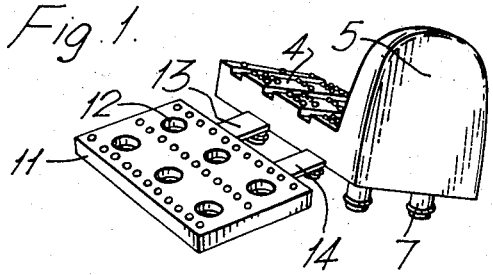
FIG. 1 is a perspective view of a bite block having an antagonist bite plate hinged thereto in accordance with the invention.

FIG. 1 is a bite block which, by hinges 13, 14, is connected to the antagonist bite plate 11. As will appear from FIG. 1, the antagonist bite plate 11 is provided with six orifices adapted for cooperation with the respective studs 7, 8, 9, 10 on the underside of the bite block 4.

Figure 5:
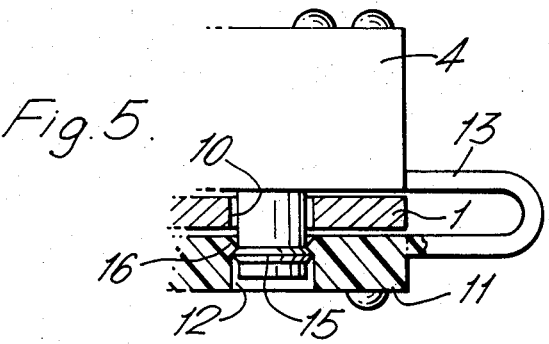
FIG. 5 is an enlarged view of a section substantially along the sectional line V—V in FIG. 3.

FIG. 5 is an example of how the studs 10 may be provided with a locking wreath 15, the orifices in the antagonist bite plate 11 being provided with a locking collar 16. The bite block and antagonist bite plate are excentric formed from a ray-permeable plastic material, and the locking wreath is readily pressed past the locking collar 16 so as to obtain a secure locking connection.

All the usual sizes of film can be used in the embodiment according to the invention, by reason of the special securing technique used. The film may also be disposed on its short or long edge in a central or an exc3ntric position.

Figure 4:
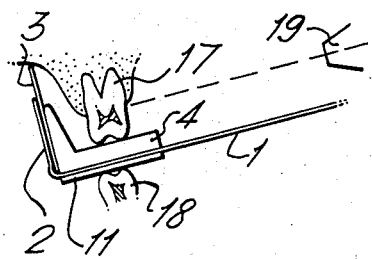
FIG. 4 is a diagrammatical view of the device in use with intra oral dental X-ray.

FIG. 4 illustrates how the X-ray is taken. The aiming rod with bite block and antagonist bite plate together with inserted film is guided to the correct position in the mouth of the patient, so that the film is parallel to the long axis of the teeth to be X-rayed, the patient then closes his mouth firmly and thus retains the film in position during exposure. In FIG. 4, the tooth to be X-rayed is referred to by 17, the antagonist by 18, and the X-ray cone by 19. The X-ray cone must be adjusted such that the central ray is parallel to the aiming rod both in horizontal and vertical plane. FIG. 4 illustrates the correct adjustment in vertical plane. FIGS. 2 and 3 show that the aiming rod is provided with a longitudinal groove 20 the extension of which is 90° to the plane of the film which indicates the optimal direction of the central ray in horizontal plane.

Having described my invention, I claim:

1. A dental X-ray film holder comprising a flat strip-like aiming rod which is bent at a right angle at one end, orifices in said rod adjacent the right angle bend, an X-ray permeable bite block having studs on one side face adapted to be passed through the said orifices in the rod, a film support extending from one end of the bite block, substantially at a right angle away from the rod and parallel with and adjacent the said right angle bend of the rod thereby forming a film receiving slot between them when the bite block is mounted on the rod with the said studs passed through the said orifices, a bite plate being provided with orifices for receivng the said studs extending through the said orifices in the rod, whereby the bite block and the bite plate are locked to the aiming rod.

2. Device according to claim 1, characterized in that the studs of the bite block are provided with a locking wreath and that the orifices in the bite plate have a step or a locking collar for cooperation with the locking wreath.

3. Device according to claim 1, characterized in that the bite block is secured to the bite plate by means of hinges.

4. A disposable dental X-ray film holding device which includes a support rod, an X-ray permeable bite block having studs on one side face, means on said rod for allowing said studs to pass therethrough to thereby mount the bite block on said rod, a film support extending from one end of the bite block and adapted to provide a film receiving slot with one end of the support rod when mounted thereon, and a mating bite plate hingedly connected to said bite block and provided with orifices adapted to receive said studs for mounting said bite block in a predetermined position on said support rod.

* * * * *